United States Patent
Khoo

(10) Patent No.: US 12,159,103 B1
(45) Date of Patent: Dec. 3, 2024

(54) SYSTEM AND METHOD FOR COMPARING MULTIPLE HTML DOCUMENTS

(71) Applicant: Justin Khoo, San Francisco, CA (US)

(72) Inventor: Justin Khoo, San Francisco, CA (US)

( * ) Notice: Subject to any disclaimer, the term of this patent is extended or adjusted under 35 U.S.C. 154(b) by 0 days.

(21) Appl. No.: 17/663,196

(22) Filed: May 12, 2022

Related U.S. Application Data

(60) Provisional application No. 63/187,886, filed on May 12, 2021.

(51) Int. Cl.
*G06F 40/194* (2020.01)
*G06F 16/958* (2019.01)
*G06F 40/106* (2020.01)
*G06F 16/9538* (2019.01)

(52) U.S. Cl.
CPC .......... *G06F 40/194* (2020.01); *G06F 16/986* (2019.01); *G06F 40/106* (2020.01); *G06F 16/9538* (2019.01)

(58) Field of Classification Search
CPC ..... G06F 40/194; G06F 16/986; G06F 40/106
See application file for complete search history.

(56) References Cited

U.S. PATENT DOCUMENTS

| | | | | |
|---|---|---|---|---|
| 5,860,071 A | * | 1/1999 | Ball | G06F 16/957 707/999.102 |
| 8,880,996 B1 | * | 11/2014 | Deshpande | G06Q 30/0255 715/234 |
| 9,092,405 B1 | * | 7/2015 | Hayden | G06F 40/197 |
| 9,336,321 B1 | * | 5/2016 | Hayden | G06F 16/9535 |
| 11,074,312 B2 | | 7/2021 | Khoo | |
| 2006/0031774 A1 | * | 2/2006 | Gaudette | G06F 40/194 715/764 |
| 2014/0105491 A1 | * | 4/2014 | Hayek | G06F 16/958 382/221 |
| 2014/0136944 A1 | * | 5/2014 | Harris | G06F 16/958 715/234 |
| 2014/0344660 A1 | * | 11/2014 | Hayden | G06F 16/957 715/229 |
| 2015/0006535 A1 | * | 1/2015 | Hayden | G06F 16/951 707/737 |
| 2015/0161087 A1 | | 6/2015 | Khoo | |
| 2018/0025503 A1 | * | 1/2018 | Tsai | G06T 11/60 382/100 |
| 2020/0117893 A1 | * | 4/2020 | Whelan | G06V 30/418 |

OTHER PUBLICATIONS

David Blooman, Responsive CSS Testing Made Simple with the BBCS Wraith, Available Online at https://source.opennews.org/articles/responsive-css-testing-made-simple-bbcs-wraith/, 8 pages, Accessed on May 11, 2022.

(Continued)

*Primary Examiner* — Asher D Kells
(74) *Attorney, Agent, or Firm* — Nicholson, De Vos, Webster & Elliott, LLP

(57) ABSTRACT

Embodiments of the present invention generally relate to the comparison of multiple HTML documents in a user interface. The HTML documents may comprise web pages, emails, or other forms of documents. A user interface presents differences between the documents in a way that is visible to the user.

8 Claims, 18 Drawing Sheets

(56) References Cited

OTHER PUBLICATIONS

Dominique Hazaël-Massieux, "Create Diff Between HTML Pages", Available Online at https://services.w3.org/htmldiff, 1 page, Accessed on May 11, 2022.

"GitHub—tnwinc_htmldiff.js_Diff algor . . . that understands HTML, in the browser", Available Online at https://github.com/tnwinc/htmldiff.js, 2 pages, Accessed on May 11, 2022.

"W3C HTMLDiff", Available Online at https://www.w3.org/wiki/HtmlDiff, 2 pages, Accessed May 11, 2022.

Anthony Thyssen, "ImageMagick v6 Examples—Image Comparing", Available Online at https://legacy.imagemagick.org/Usage/compare/, Jun. 7, 2005, Version 6, 31 pages, Accessed May 11, 2022.

* cited by examiner

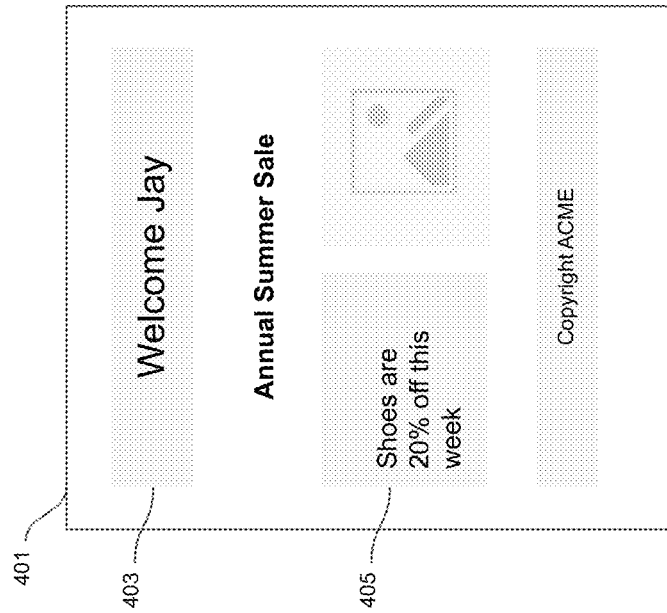
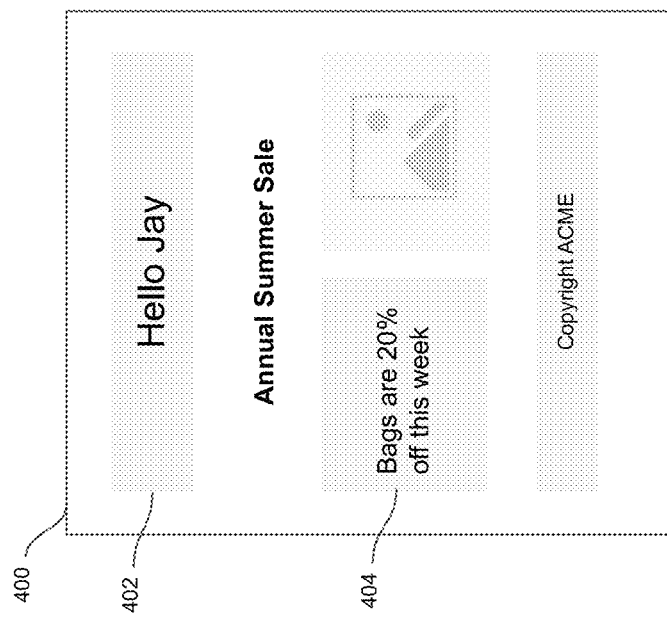
Fig 4

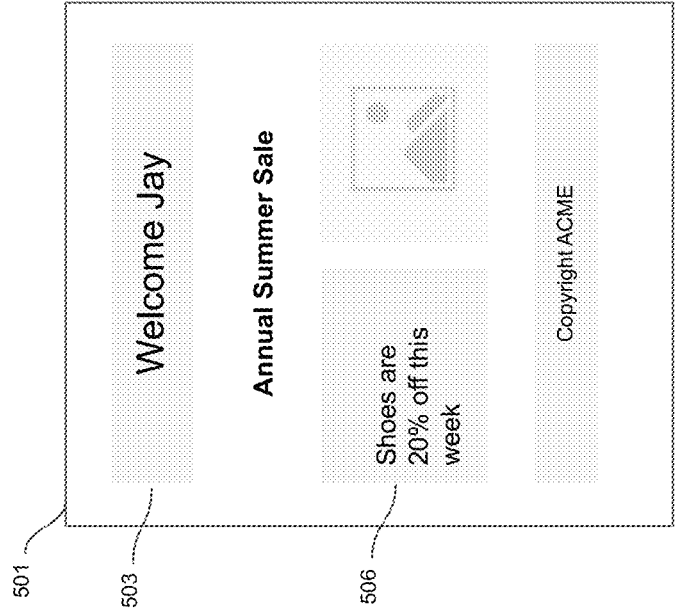
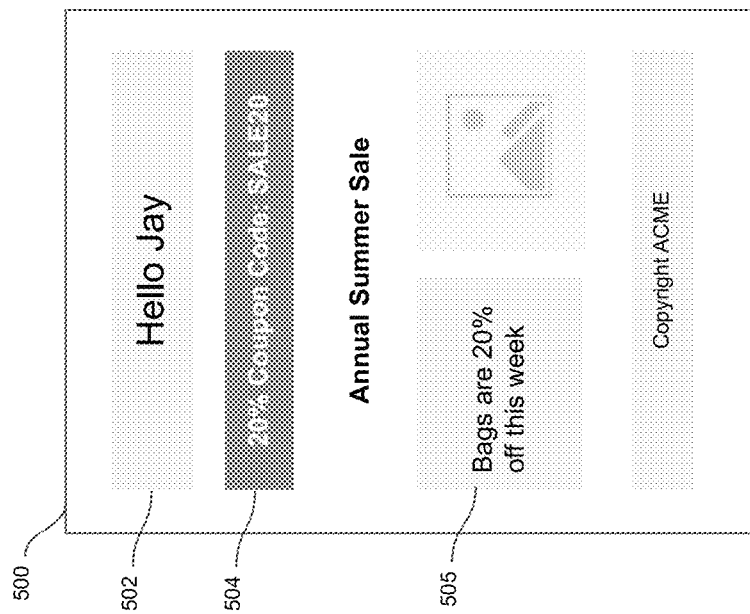
Fig 5

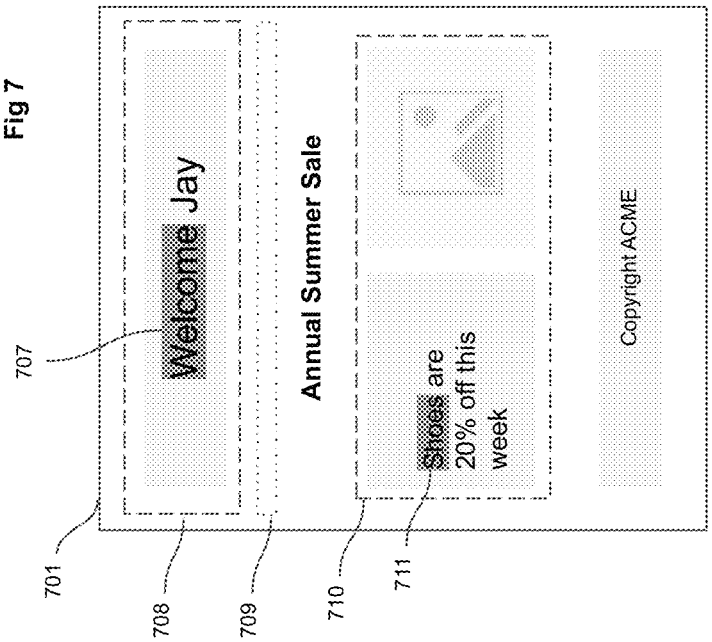
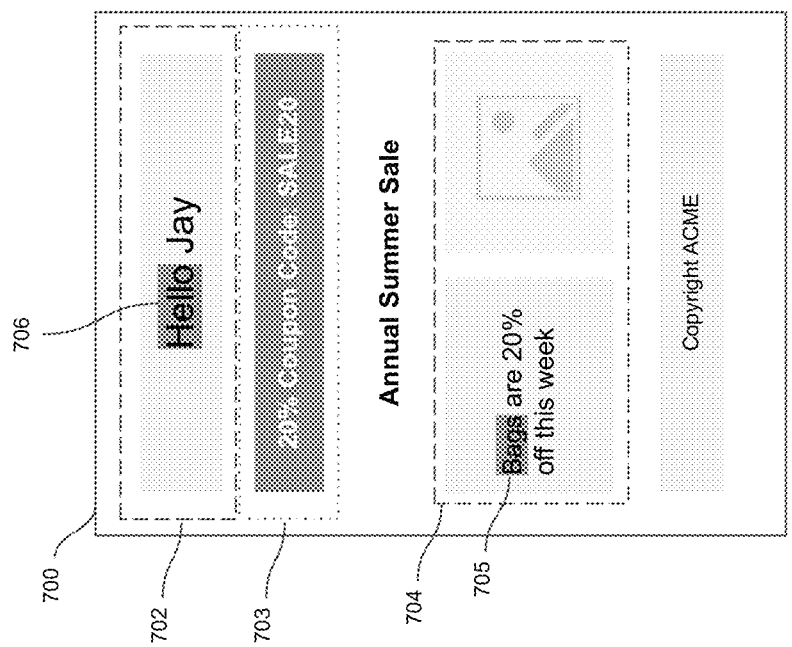
Fig 7

| Left chunk | Left text | Right chunk | Right text | Score | Best match |
|---|---|---|---|---|---|
| 602a | Hello Jay | 605a | Welcome Jay | 0.375 | Y |
| 602a | Hello Jay | 605b | Annual Summer Sale Shoes are 20% off this week | 0 | N |
| 602a | Hello Jay | 605c | Copyright ACME | 0 | N |

| Left chunk | Is Leaf? | Left text | Best match | Right text | Score |
|---|---|---|---|---|---|
| 602a | Y | Hello Jay | 605a | Welcome Jay | 0.375 |
| 602b | Y | 20% Coupon Code: SALE20 | NONE | - | - |
| 602c | N | Annual Summer Sale Bags are 20% off this week | 605b | Annual Summer Sale Shoes are 20% off this week | 0.876 |
| 602d | Y | Copyright ACME | 605c | Copyright ACME | 1 |

1001

| Left chunk | Is Leaf? | Left text | Best match | Right text | Score |
|---|---|---|---|---|---|
| 603a | Y | Annual Summer Sale | 606a | Annual Summer Sale | 1 |
| 603b | Y | Bags are 20% off this week | 606b | Shoes are 20% off this week | 0.83 |

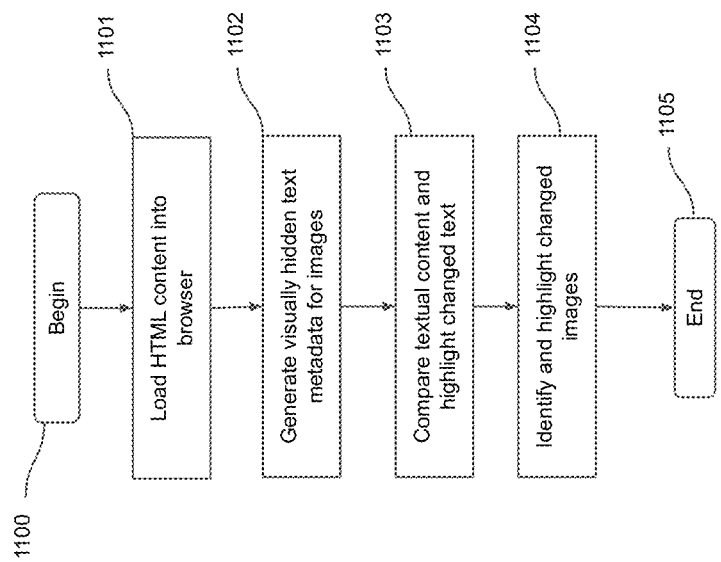

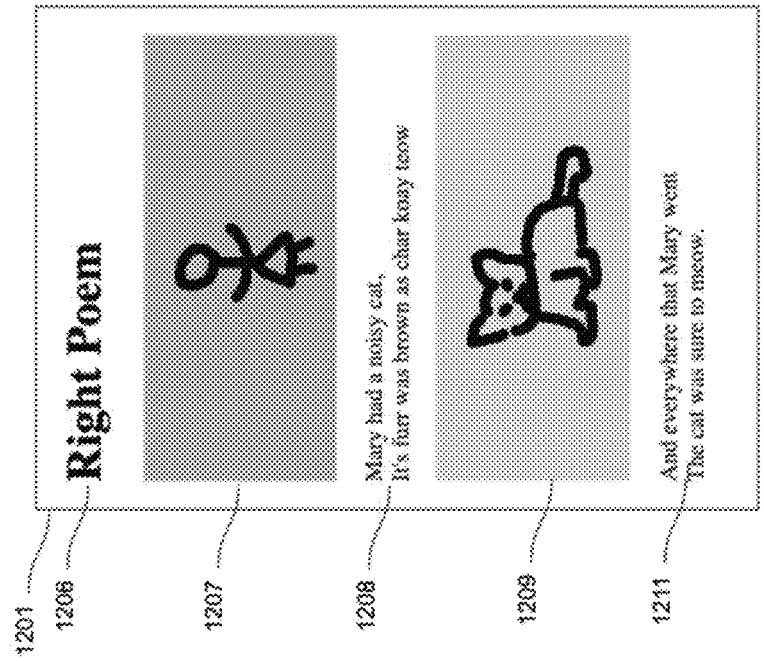
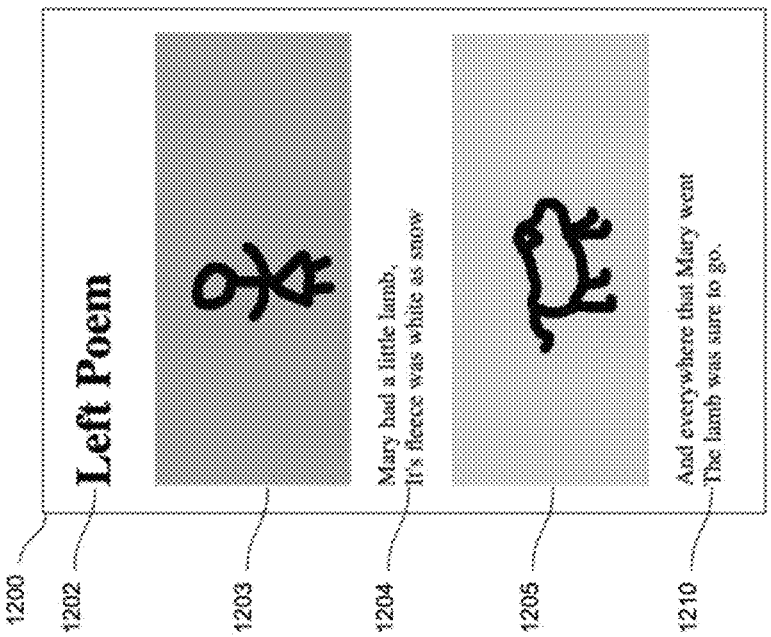
Fig 12

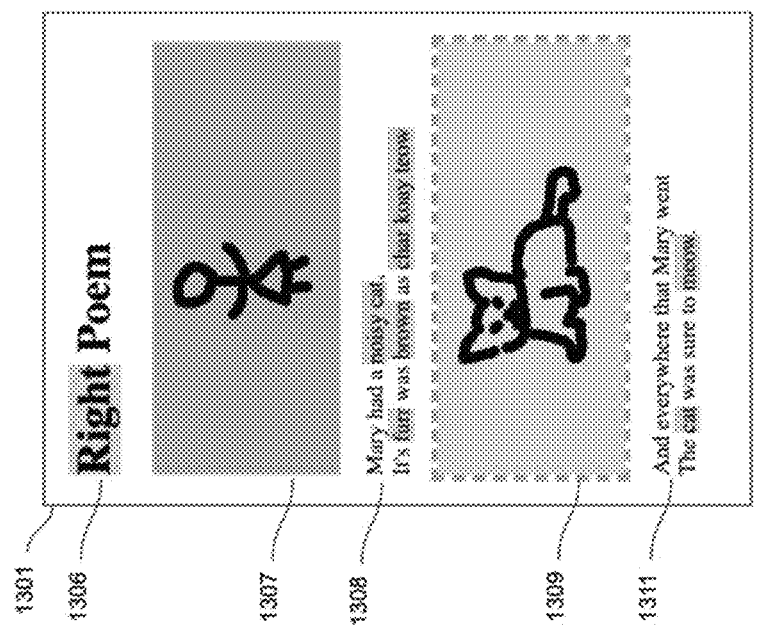
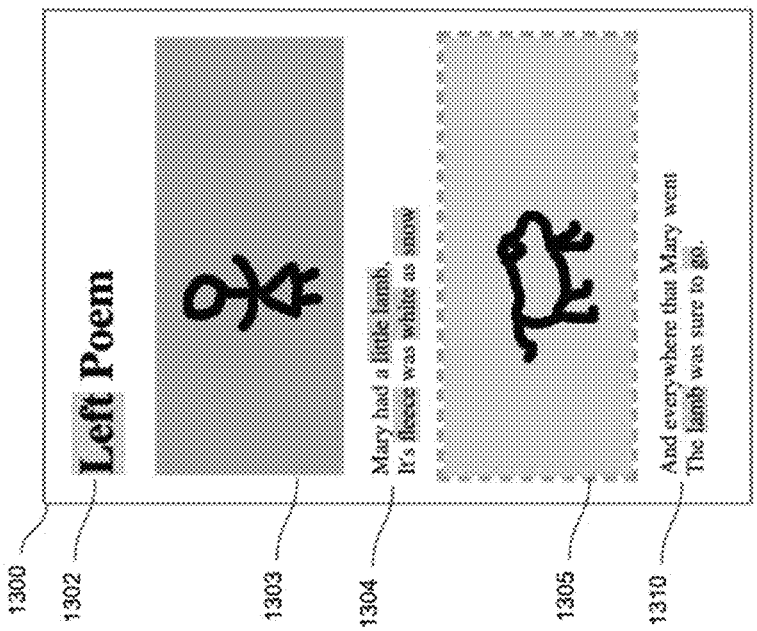
Fig 13

1406  `<div>`
1407  `<h1>Right Poem</h1>`
       `<img width=300 alt="Mary pic"`
1408       `src="https://acme.com/mary.jpg">`
       `<p>Mary had a noisy cat,<br>`
1409   `It's furr was brown as char koay teow</p>`
       `<img width=300 alt="Cat pic"`
1411       `src="https://acme.com/cat.jpg">`
       `<p>And everywhere that Mary went<br>`
       `The cat was sure to meow.</p>`
       `</div>`

1400

1402  `<div>`
1403  `<h1>Left Poem</h1>`
       `<img width=300 alt="Mary pic"`
1404       `src="https://acme.com/mary.jpg">`
       `<p>Mary had a little lamb,<br>`
1405   `It's fleece was white as snow</p>`
       `<img width=300 alt="Lamb pic"`
1410       `src="https://acme.com/lamb.jpg">`
       `<p>And everywhere that Mary went<br>`
       `The lamb was sure to go.</p>`
       `</div>`

```
<div>
<h1>Left Poem</h1>
```

1502
```
<img img_uuid="img_001" width=300 alt="Mary pic"
    src="https://acme.com/mary.jpg">
```

1503
```
<span ref_img_uuid="img_001" class="img_text"
        style="display: none;">
    url: https://acme.com/mary.jpg
    width: 300px
    alt: Mary pic
</span>
```

```
<p>Mary had a little lamb,<br>
It's fleece was white as snow</p>
```

1504
```
<img img_uuid="img_002" width=300 alt="Lamb pic"
    src="https://acme.com/lamb.jpg">
```

1505
```
<span ref_img_uuid="img_002" class="img_text"
        style="display: none;">
    url: https://acme.com/lamb.jpg
    width: 300px
    alt: Lamb pic
</span>
```

```
<p>And everywhere that Mary went<br>
The lamb was sure to go.</p>
</div>
```

```
<div>
<h1>Right Poem</h1>
```

1506
```
<img img_uuid="img_003" width=300 alt="Mary pic"
    src="https://acme.com/mary.jpg">
```

1507
```
<span ref_img_uuid="img_003" class="img_text"
        style="display: none;">
    url: https://acme.com/mary.jpg
    width: 300px
    alt: Mary pic
</span>
```

```
<p>Mary had a noisy cat,<br>
It's furr was brown as char koay teow</p>
```

1508
```
<img img_uuid="img_004" width=300 alt="Cat pic"
    src="https://acme.com/cat.jpg">
```

1509
```
<span ref_img_uuid="img_004" class="img_text"
        style="display: none;">
    url: https://acme.com/cat.jpg
    width: 300px
    alt: Cat pic
</span>
```

```
<p>And everywhere that Mary went<br>
The cat was sure to meow.</p>
</div>
```

1602
```
<div>
<h1><ins>Left</ins> Poem</h1>
```

1603
```
<img img_uuid="img_001" width="300" alt="Mary pic"
     src="https://acme.com/mary.jpg">

<span ref_img_uuid="img_001" class="img_text"
      style="display: none;">
  url: https://acme.com/mary.jpg
  width: 300px
  alt: Mary pic
</span>
```

1604
```
<p>Mary had a <ins>little lamb</ins>,<br>
It's <ins>fleece</ins> was <ins>white</ins> as
<ins>snow</ins></p>
```

1605
```
<img img_uuid="img_002" width="300" alt="Lamb pic"
     src="https://acme.com/lamb.jpg">

<span ref_img_uuid="img_002" class="img_text"
      style="display: none;">
  url: https://acme.com<ins>/lamb</ins>.jpg
  width: 300px
  alt: <ins>Lamb</ins> pic
</span>
```

1610
```
<p>And everywhere that Mary went<br>
The <ins>lamb</ins> was sure to <ins>go</ins>.</p>
</div>
```

1601

1606
```
<div>
<h1><ins>Right</ins> Poem</h1>
```

```
<img img_uuid="img_003" width="300" alt="Mary pic"
     src="https://acme.com/mary.jpg">

<span ref_img_uuid="img_003" class="img_text"
      style="display: none;">
  url: https://acme.com/mary.jpg
  width: 300px
  alt: Mary pic
</span>
```

1607
```
<p>Mary had a <ins>noisy cat</ins>,<br>
It's <ins>furr</ins> was <ins>brown</ins> as
<ins>char koay teow</ins></p>
```

1608
1609
```
<img img_uuid="img_004" width="300" alt="Cat pic"
     src="https://acme.com/cat.jpg">

<span ref_img_uuid="img_004" class="img_text"
      style="display: none;">
  url: https://acme.com<ins>/cat</ins>.jpg
  width: 300px
  alt: <ins>Cat</ins> pic
</span>
```

1611
```
<p>And everywhere that Mary went<br>
The <ins>cat</ins> was sure to <ins>meow</ins>.</p>
</div>
```

SYSTEM AND METHOD FOR COMPARING MULTIPLE HTML DOCUMENTS

PRIORITY

This application claims priority from U.S. Provisional filing Ser. No. 63/187,886, filed May 12, 2021, which is hereby incorporated by reference herein in its entirety, including Appendices A and B of the provisional application.

FIELD OF THE INVENTION

Embodiments of the present invention generally relate to the comparison of multiple HTML documents in a user interface. The HTML documents may comprise web pages, emails, or other forms of documents.

BACKGROUND

There is often a need to review and compare multiple documents by users for purposes such as comparing different versions of documents to each other, or variations of a document. One example of comparing variations of a document is in email campaigns where a single email campaign may comprise variations of a single email where parts of the emails are changed or personalized based on the recipient's demographic or segment in a database. For example, variations of emails may show a user different offers based on the user's past purchases.

The variations may also include information such as a recipient's name, loyalty tier or location. This may also include extra pieces of content such as a personalized coupon code or information about past purchases Conventionally, there are a few approaches to comparing documents such as web pages but they come with certain limitations.

An example of a one conventional way to compare two web pages is by capturing an image or screenshots of two web pages and overlaying the screenshots of the two web pages over each other and showing the differing content using tools such as ImageMagick and BBC's Wraith. The downside of this is that slight differences in placement of content will result in the misalignment of content, causing even similar content to be highlighted as if the content itself had changed. This method also makes identifying differences in textual content difficult since overlaying different text over each other results in a garbled and undecipherable image.

An example of more promising and practical prior art for comparing documents is using HTML diffing tools like the W3C Html Diff Website (https://services.w3.org/htmldiff) ("W3C HTML Diff") or the htmldiff javascript library https://github.com/tnwinc/htmldiff.js ("htmldiff library") which does an HTML compare between two documents and highlighting the text changes. This method benefits from being able to highlight textual changes as well as not be susceptible to minor changes in placement of textual content. Other prior art HTML diffing solutions can be viewed here: https://www.w3.org/wiki/HtmlDiff.

However conventional HTML diffing tools suffer from several shortcomings. Firstly, since they are primarily textual in nature these tools fail to highlight the changes to areas that are not textual, such as the changes of a structure of a web page, for example, if a button is present in one page and not another, instead of showing that the button has been added, the current diffing tools highlight the text within the button which can confuse users leading them to try to locate the button in the other page which isn't there.

Conventional HTML diffing tools also suffer from the inability to detect the difference of visible elements when rendered since these tools only analyze the actual HTML markup and not the rendered state of the elements. Therefore, if both documents contain an element (i.e. a button) but one document has the button displayed and the other has the button hidden through Cascading Style Sheets (CSS) (i.e. display:none), the HTML diffing tool would detect no difference since the difference in visibility only takes effect during rendering.

Lastly HTML diffing tools often compare text across container boundaries. Which means text within several consecutive containing elements (such as divs or tables) might be compared as a whole making the tool highlight differences in text across unrelated sections.

Refer to FIG. 17 which features an example of a prior art website at https://services.w3.org/htmldiff "W3C HTML Diff" that allows for the input of two URLs which will be compared and the difference shown.

Figure 18:
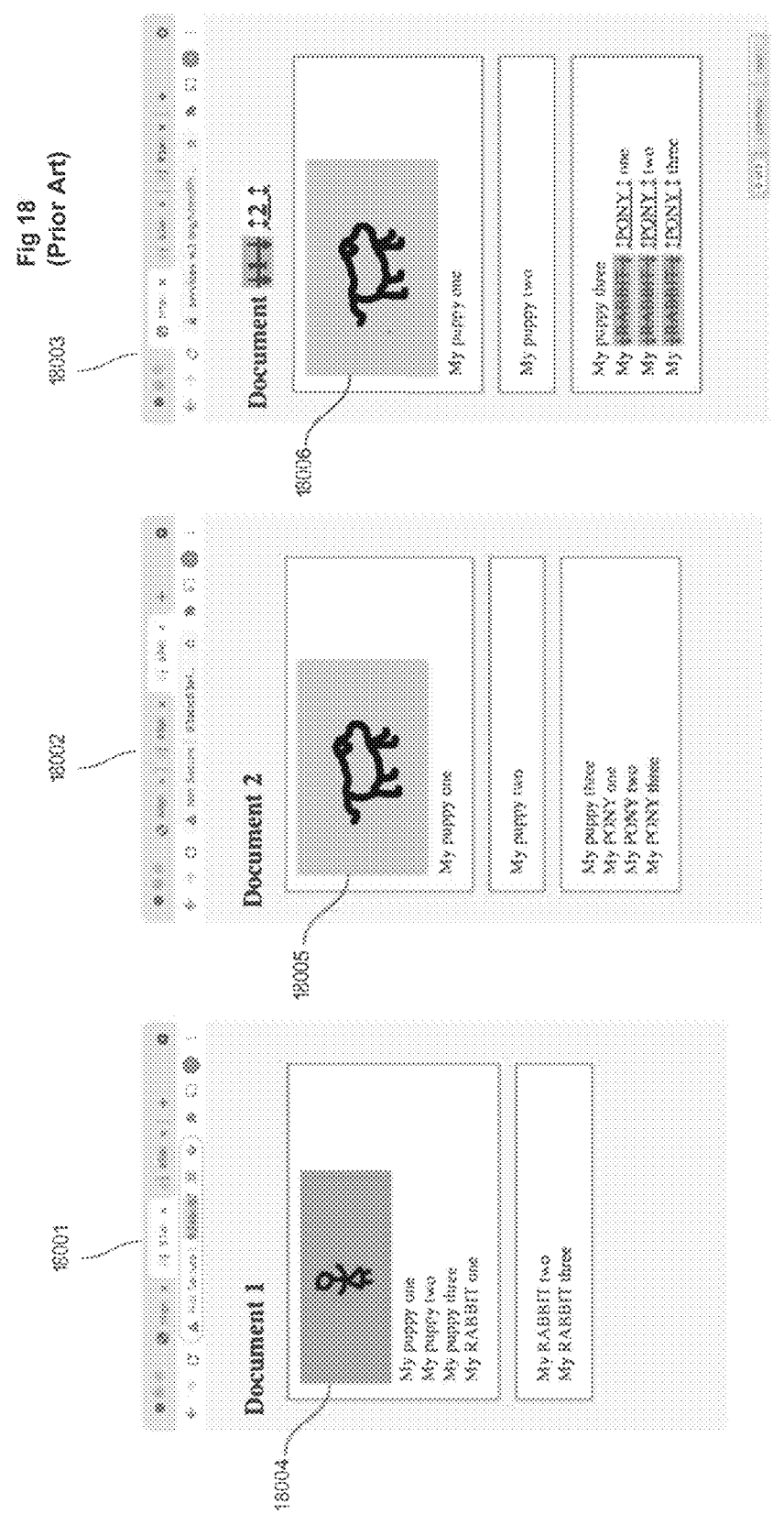

FIG. 18 shows the result comparison of two HTML documents using the service shown in FIG. 17. The first document 18001 with two div containers with text with a first image 18004, the second document 18002 with 3 containers with text and a second image 18005 in the proximate location of the first image and the result of the comparison by the W3C HTML Diff in 18003 wherein the second image is displayed 18006.

The conventional methods suffer from the following drawbacks.
1) The comparison ignores container boundaries so even though there are differing text within all the containers, only one container (the third one) is highlighted by the prior art to have "differing" text. Although textually this may be "correct", visually based on the boundaries of the containers this is erroneous as it does not show the textual differences within each container.
2) The comparison does not show that the second document 18002 contains an extra container. Therefore, users viewing the comparison result would not be notified that the number of containers has changed-either added or removed.
3) The container with changes is not highlighted, so users cannot at a glance appreciate any non-textual changes between them.
4) Having just one view 18003 of both the additions and deletions can be confusing as seen in 18003. It would be advantageous to have both documents visible and highlighting the differences in the respective documents.

SUMMARY OF THE INVENTION

Many web sites and emails are built using modules within content management systems where these modules placed into a canvas to build a complete document.

Often it can be useful to view changes as "blocks" of content instead of merely highlighting textual or imagery differences.

It is a goal of embodiments of the present invention to overcome the current deficiencies of the prior art as well as to support the review of differences between multiple HTML documents such as web pages and emails as "blocks" or "rows" instead of just text highlights.

Accordingly, embodiments of the present invention are directed to providing a system and method that will allow the comparison of multiple documents containing HTML to each other—allowing the user to quickly see the differences not only in textual content but also the structure of the documents. These documents may include but are not limited to web pages and email messages.

Embodiments of the present invention also allow for the identification of areas that are missing from one document to another as well as easily highlight areas of content using visual indicators such as borders or outlines around content or other visual indicators.

Embodiments of the present invention also allow for comparison of the same document in multiple container dimensions—and hence allow the user to easily identify areas that may have changed (i.e., the display of buttons or hiding of images) from one view to another when for example the width of the document changes.

An embodiment of the present invention covers the ability to detect and highlight elements containing images that have been modified between multiple documents.

BRIEF DESCRIPTION OF THE DRAWINGS

FIG. 4 is an illustration of example embodiments of two documents containing HTML with similar structure containing differences in textual content.

FIG. 5 is an illustration of example embodiments of two documents containing HTML with differences in structure and textual content.

FIG. 7 is an illustration of example embodiments of two documents containing HTML with differences in structure and textual content rendered in a user interface displaying highlights denoting changes in content.

FIG. 9 is a table of an example comparison of content within a chunk of one document compared with the content of a list of chunks in a separate document.

FIG. 10 are two tables of example matching of chunks within one document with chunks in a separate document.

FIG. 11 is an illustration of an example process flow, in accordance with an embodiment of the present invention-depicting the process of identifying and highlighting changes of image content and text between sections of two documents containing HTML.

FIG. 12 is an illustration of example embodiments of sections of two documents containing HTML with differences in textual and image content.

FIG. 13 is an illustration of example embodiments of sections of two documents containing HTML with differences in textual and image content (of FIG. 12) rendered in a user interface displaying highlights denoting changes in content and images.

FIG. 14 is an illustration of example embodiments of the HTML markup of sections of two documents containing HTML with differences in textual and image content.

FIG. 15 is an illustration of example embodiments of the HTML markup of sections of two documents containing HTML with differences in textual and image content (of FIG. 14) after hidden text metadata for images has been generated.

FIG. 16 is an illustration of example embodiments of the HTML markup of sections of two documents containing HTML with differences in textual and image content (of FIG. 14) after hidden text metadata for images has been generated (FIG. 15) and markup has been added to visually highlight textual changes.

Figure 17:
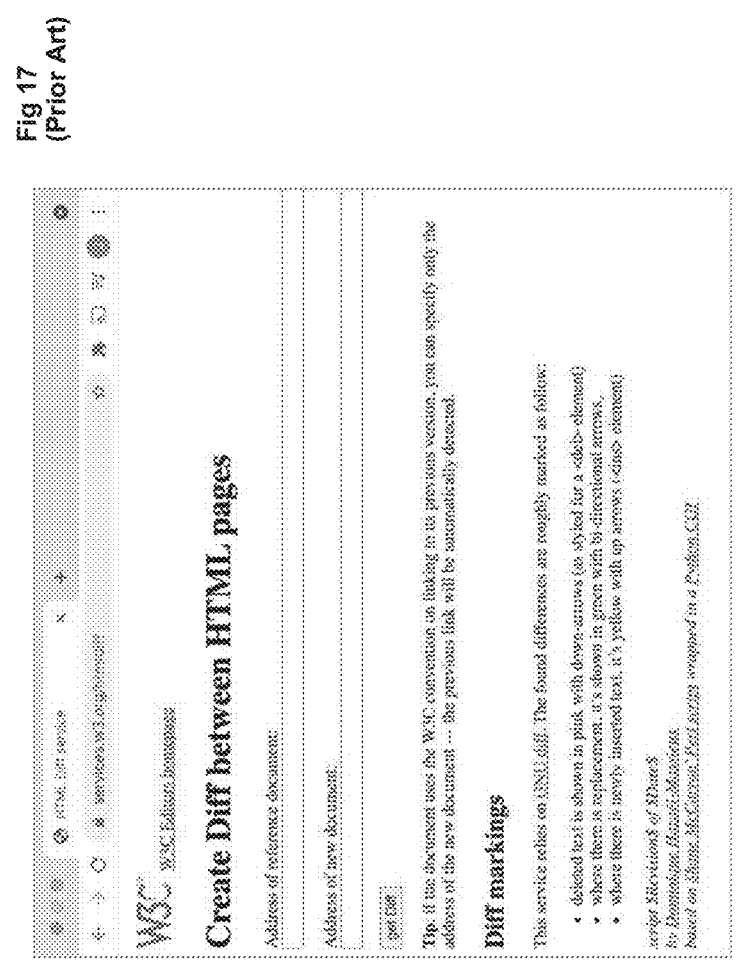

FIG. 17 is an example of a prior art website that compares two HTML documents and displays the difference.

FIG. 18 is an example of a prior art website showing the result of the comparison of two HTML documents.

DETAILED SPECIFICATION

Embodiments of the present invention generally relates to the ability to display differences in content between multiple documents containing HTML-allowing the user to quickly see the differences not only in textual content but also changes in image content and structure of the documents. These documents may include but are not limited to web pages and email messages.

Figure 1:
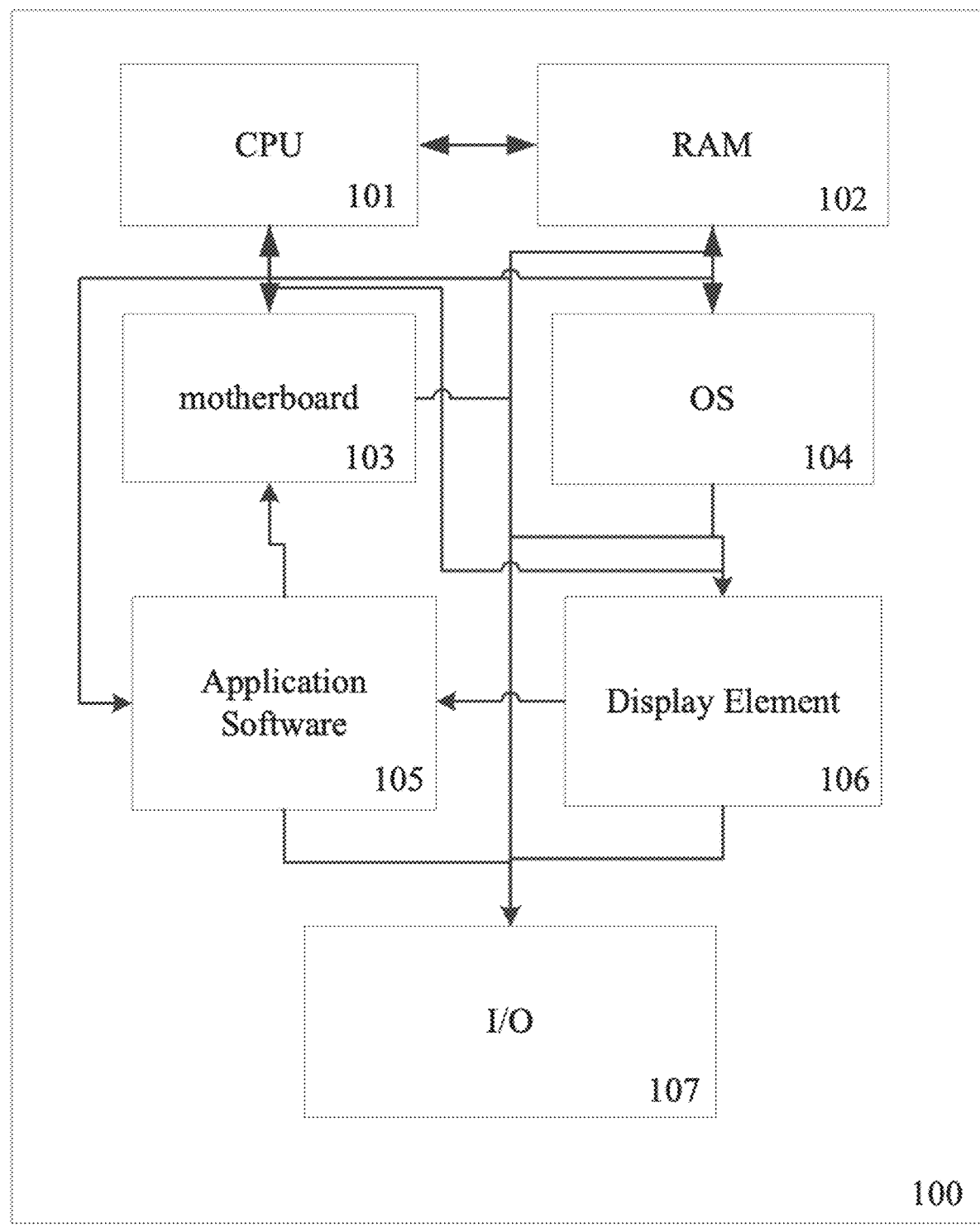
FIG. 1 illustrates a schematic overview of a computing device, in accordance with an embodiment of the present invention.

According to an embodiment of the present invention, the system and method is accomplished through the use of one or more computing devices. As shown in FIG. 1, one of ordinary skill in the art would appreciate that a computing device 100 appropriate for use with embodiments of the present application may generally comprise one or more of a Central Processing Unit (CPU) 101, Random Access Memory (RAM) 102, a storage medium (e.g., hard disk drive, solid state drive, flash memory, cloud storage) 103, an operating system (OS) 104, one or more application software 105, one or more display elements 106 and one or more input/output devices/means 107. Examples of computing devices usable with embodiments of the present invention include, but are not limited to, personal computers, smartphones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an example embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be performed by a user of a computing device whether connected to a network or not. Some of the embodiments of the present invention may not be accessible when not connected to a network, however a user may be able to compose data offline that will be consumed by the system when the user is later connected to a network. Generally, instructions performing the methods discussed herein are stored in a memory, such as RAM 102 and performed by a processor, such as CPU 101.

Figure 2:
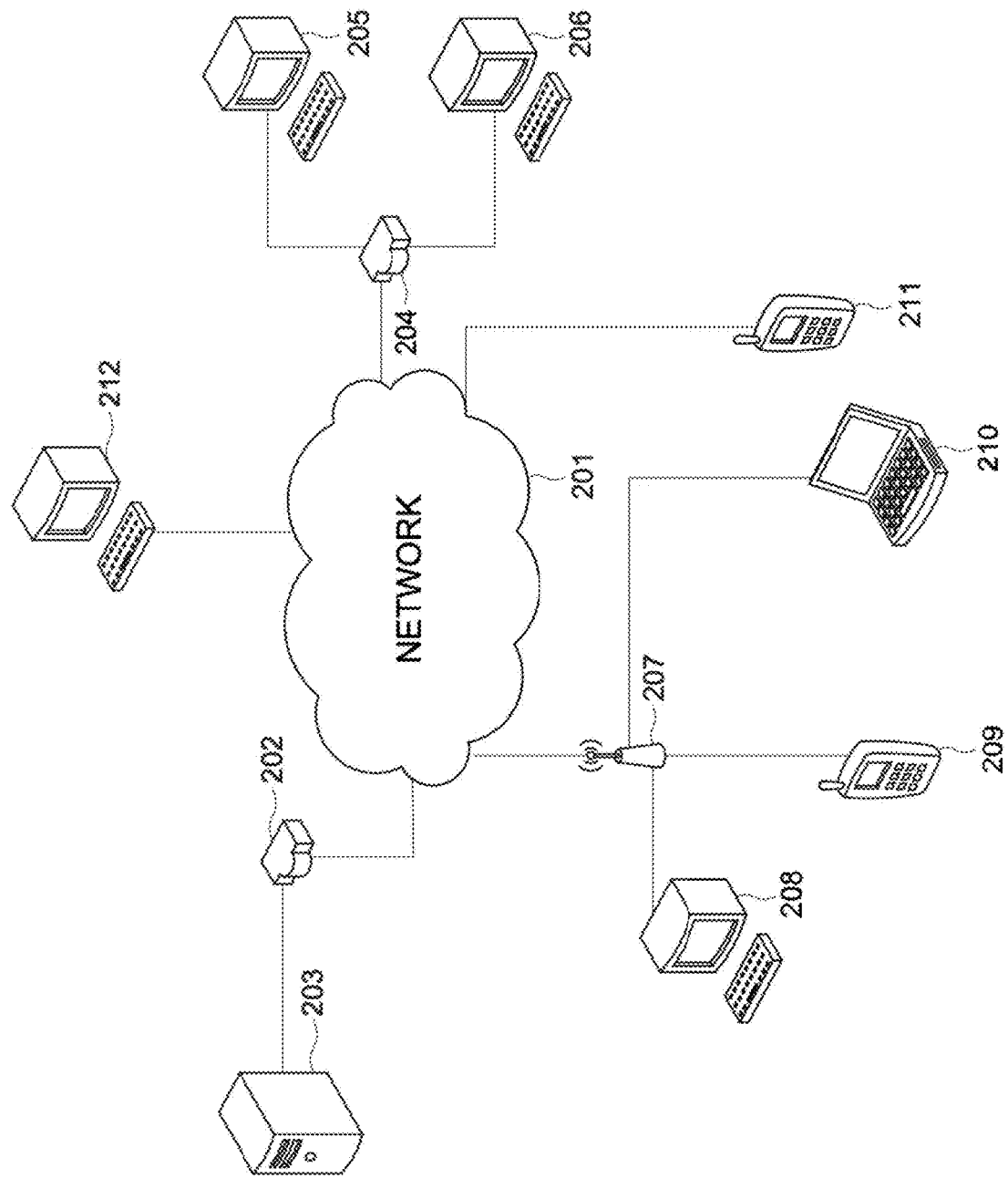
FIG. 2 illustrates a network schematic of a system, in accordance with an embodiment of the present invention.

Referring to FIG. 2, a schematic overview of a system in accordance with an embodiment of the present invention is shown. The system comprises one or more application servers 203 for electronically storing information used by the system. Applications in the application server 203 may retrieve and manipulate information in storage devices and exchange information through a Network 201 (e.g., a WAN, the Internet, a LAN, WiFi, Bluetooth, etc.). Applications in server 203 may also be used to manipulate information stored remotely and process and analyze data stored remotely across Network 201 (e.g., a WAN, the Internet, a LAN, WiFi, Bluetooth, etc.).

According to an example embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with embodiments of the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Furthermore, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201.

Furthermore, server 203 could comprise a personal computing device, such as a smartphone, acting as a host for other computing devices to connect to.

Chunks

As used herein, the term "chunk" relates to any rectangular shaped container of HTML content such as block elements-including but not limited to divs, tables, table cells—that meet a "chunk criteria". The term "block elements" will be used to denote any rectangular shaped element although it can be appreciated that any element rectangular in shape may be used certain embodiments.

In various embodiments, the chunk criteria may include one or more of: a minimum height and/or width of an element in some units such as pixels, whether the element is currently displayed (vs hidden-such as using the CSS display:none), the exclusion of certain elements in a predefined list of elements (for example table rows), and whether or not a container is inside of a "leaf chunk". In an embodiment, a chunk criteria is stored in, for example, storage 103 or RAM 102 of FIG. 1.

As used herein, the term "leaf chunk" relates to when a chunk (a container meeting the chunk criteria) contains one or more "terminal nodes". In various embodiments of the invention, a terminal node may comprise an image or a text node (i.e. plain text content) or inline or non strictly rectangular elements (such as span). Depending on the embodiment, certain terminal nodes may be disregarded or ignored as well—for example if the terminal node is near the top, the Document Object Model (DOM) tree or if a terminal node contains no content (i.e. empty text node) or is deemed insignificant-such as a tiny image or element. A disregarded terminal node means that the node is not taken into consideration when determining if its parent is a "leaf chunk".

A chunk of one document that has no matching chunk on another compared document is referred to as an "orphan chunk". In an embodiment of the invention, an orphan chunk is also a leaf chunk.

User Interface

Figure 3:
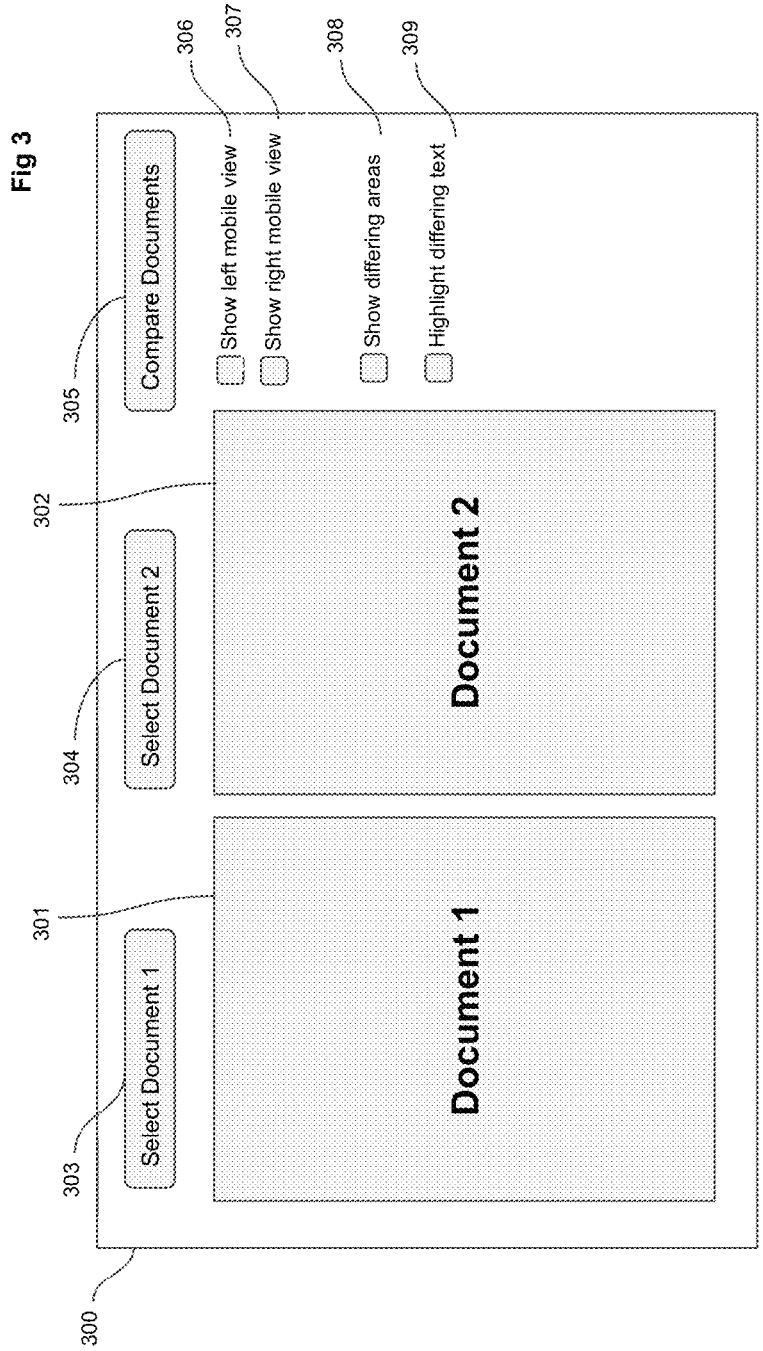
FIG. 3 is an illustration of an example embodiment of a user interface of an embodiment of the present invention used to compare two documents containing HTML.

FIG. 3 depicts a user interface 300 of an embodiment of the present invention wherein two documents 301 and 302 containing variation in HTML content are being displayed in the user interface. The user interface provides a user a means to select or input documents containing HTML 303 and 304 (for example, buttons 303 and 302 might be a dropdown list) and a button 305 to execute the comparison process that will visually highlight the differing content between the two documents within the user interface. It will be understood that the contents of Document 1 and Document 2 are displayed in user interface 300.

Furthermore, an embodiment of the user interface contains options that allow the user to select a mobile view 306, 307 which allow adjusts the width of the containers from a "desktop view" (i.e. 800 pixels wide) to a "mobile view" (i.e . . . 400 pixels wide) of the documents as well as options whether to display markings such as an outline (border) around differing areas (chunks) 308 of content and highlighting of differing text 309 within matching chunks.

Structure of Documents

Discussion of Conventional Systems: Similar DOM Structure Comparison

FIG. 4 depicts two documents 400/401 with a similar structure (DOM element structure) but with minor differences in textual content 402, 403, 404, 405. The documents 400 and 401 are good candidates for conventional methods to compare changes in content because they are somewhat similar in content (text and images) and in structure. For the image comparison conventional approach, overlaying an image rendering of 400 over 401 would clearly show two areas of differing content and HTML Diff method would be able to easily highlight the simple textual content differences between the two documents.

Discussion of Conventional Systems: Different DOM Structure Comparison

FIG. 5 depicts two documents 500/501 with a difference in structure (DOM element structure)—an inclusion of an element containing content 504—as well as difference in textual content 502, 503, 504, 506.

The documents 500 and 501 are examples where conventional methods are deficient in being able to compare changes in content because the two documents have multiple differences in both content and structure For the conventional image comparison approach, overlaying an image rendering of 500 over 501 would show large differences in content below the first content area 502, 503 even though in actuality most of the content are similar. This is due to the inability of image-based comparisons to account for changes of the positioning of content within two documents. Here, "Annual Summer Sale" is present in both documents, but is located in a different location.

For the conventional HTML comparison approach (HTML diff), the approach would result in the difference in text in 502, 503, 505, 506 being highlighted as well as the entire text in 504 being highlighted. Unfortunately, having 504 highlighted does not convey to a user that the complete section is unique to 500. A user may assume that the section exists in 501, but just with a different text. Therefore, a different approach is suggested by embodiments of the present invention.

Explanation of Embodiments of the Present Invention

Breaking a Document Into Chunks

Figure 6:
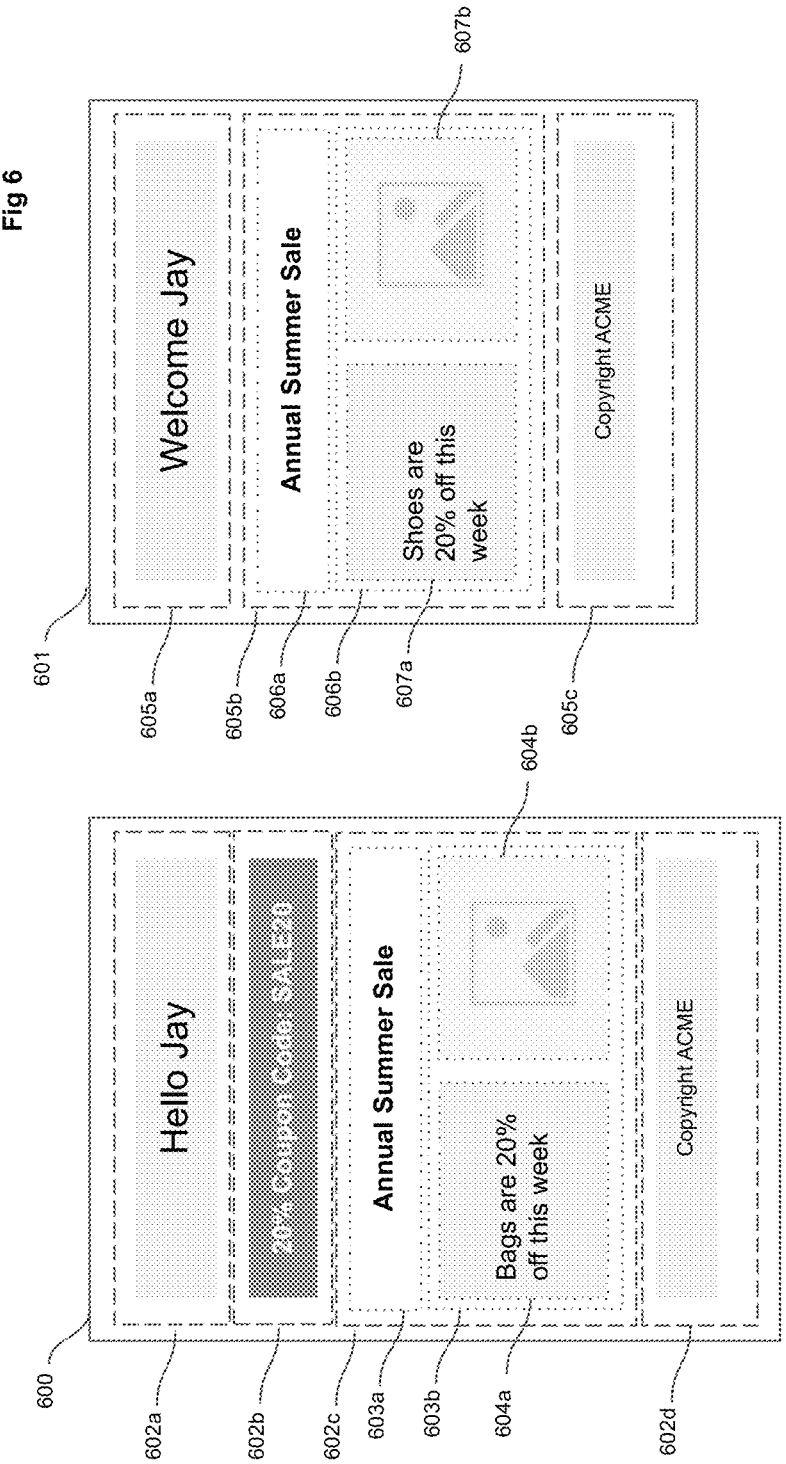
FIG. 6 is an illustration of example embodiments of two documents containing HTML with differences in structure and textual content with container elements outlined.

According to an embodiment of the present invention, a method to compare two documents breaks the documents into chunks. FIG. 6. Is an illustration of two documents where dashed outlines denote block elements (rectangle containers) 602a, 602b, 602c, 602d, 605a, 605b, 605c that are a direct or immediate children of the respective top level containers within the documents 600, 601, some of which contain differences in structure as well as textual content. Some of the first level block elements contain child block elements denoted with dotted outlines 603a, 603b, 604a, 604b, 606a, 606b, 607a, 607b. The dashed and dotted outlines illustrated in FIG. 7 in particular are visible outlines that are visible to a user to help a user identify chunks where content has been added or changed (unlike outlines in FIG. 6, which are provided to aid in understanding of the embodiment as they merely serve to illustrate the boundaries of various block elements).

Figure 8:
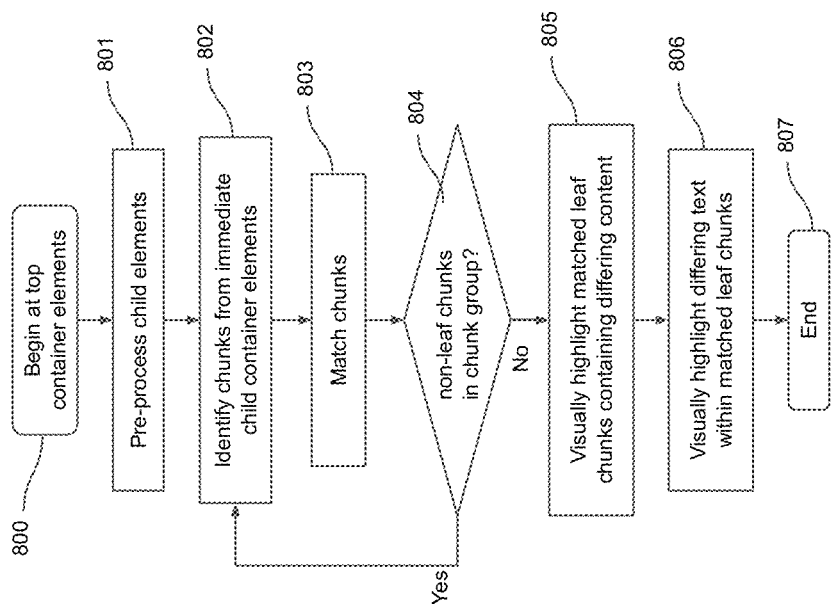
FIG. 8 is an illustration of an example process flow, in accordance with an embodiment of the present invention-depicting the process of identifying, matching and highlighting changes in content between two documents containing HTML.

FIG. 8 is a flow chart of an embodiment of the presentation invention which denotes the process flow to highlight differing chunks and text between two documents. We will illustrate the flow by showing what happens in an example of two documents shown in FIG. 6 with the resulting outlines and highlights being displayed in FIG. 7.

The process begins when the documents in FIG. 6 have been loaded and into the user interface 300 and rendered (or displayed) where in the first document 600 is loaded into the first area 301 and the second document 601 is loaded into the second area 302 and the user clicks on the Compare Document button 305. The user has also selected to show differing areas 308 and highlight different text 309.

At 800, the process obtains references to the "top level element" in the first 600 and second 601 documents. The first document may also be referred to as the "left document" and the second document may also be referred to as the "right document".

The top level element in this embodiment is the <body>tag, however, it can be appreciated that any element within a document can be used as the "top level element" for example when there are static heads and footers and the goal is to only compare a particular section within both documents wherein that section can be used as the "top level" element. Methods to obtain a reference to elements in a rendered HTML document using the Document Object Model (DOM) are well known to those skilled in the art.

In an embodiment of the invention, the user interface is a web page implemented in Javascript and both documents 600 and 601 are loaded within iframes in the areas 301 and 302. The purpose of embedding documents in iframes is to prevent any CSS styles of the documents affecting the styles of the user interface. However it can be appreciated that the user interface may be a "native" application implemented in languages such as Objective C, VisualBasic or other languages and iframes may not be required in all embodiments.

Element 801 is an optional element wherein certain elements are modified to enhance the process of matching and comparing chunks and will be explained in the section Optional Matching Optimizations.

At Element 802, direct or immediate child nodes of the referenced elements of both documents are located and categorized into one of three types: i) terminal nodes, ii) eligible nodes and iii) discarded nodes. Terminal nodes in an embodiment of the invention may comprise text nodes, inline elements and images. Eligible nodes may comprise block elements.

Depending on the configuration and progress of the process of identifying chunks of content discarded nodes may comprise empty text nodes, empty elements, block elements smaller than a certain dimension in our case-less than 10 pixels wide (these elements are most probably spacers and don't contain meaningful data), hidden elements (such as elements set to display:none) and intrinsically invisible elements such as style and script tags. Empty elements as described may contain whitespace but no visible elements within.

In an embodiment of the invention, the calculation of dimensions of the elements are performed after the elements in the documents have been rendered in a user interface-such as in an iframe in a web browser. This means for example certain elements may not have their widths or heights set directly to the element and their widths and heights are dependent on the contents within it or containers wrapping it (i.e. width: auto). This is called the element's "layout width" or "layout height"—the dimensions the element occupies in the page. Calculating the layout widths of an element can be achieved using JavaScript and obtaining the element's "offsetWidth" and "offsetHeight" for layout height. Other methods to calculate an element's layout dimensions familiar to those who are skilled in the art can be used as well.

If a node can be categorized into multiple node types, the discarded node type takes precedence. Discarded nodes once categorized are ignored in the process flow. The reason for discarded nodes are that these elements are deemed insignificant and may pollute the process to determine ideal chunks in the document. For example, emails commonly attach a 1 pixel wide image that is used to track if the emails are opened. These pixels may be added at any part of the email and for the purposes of visual comparison has no significance. Similarly, image "spacers" only serve to help the layout of an email but have no significance otherwise so they can be ignored.

If there are no terminal nodes identified, then the eligible nodes are inspected to see if they pass a "chunk criteria" to be labelled as a chunk. In tan embodiment of the invention, the chunk criteria includes having a minimum height of 20 pixels and width of at least half the width of the content within the document (excluding the empty gutter/margin space to the left and right of the content). These values can depend on various preset configuration and a fixed width value may be used such as 400 pixels for document containers 800*px* wide and 200*px* for document containers 400*px* wide. The reason for the minimum widths and heights is so that the highlight of a chunk area is meaningful—as the goal is to highlight "content modules" in the document-areas where the content creator has inserted chunks of content-and having too small an area to highlight may cause the document to highlight many small areas of differing content vs highlighting a wide container of differing content. Highlighting a large area instead of many small areas aids in the understanding of the user are the user will see the big picture instead of many small changes.

Using FIG. 6 as a reference, block elements 602a, 602b, 602c and 602d of the first document 600 and block elements 605a, 605b and 605c of the second document 601 are selected as first level (high level) "chunks" during the identification of chunks from the direct child elements of the top level elements. Chunks from a common parent are referred to as a "chunk group".

Comparing Chunks

At element 803 of FIG. 8 the first level (high level) chunk group of the first document 600 are compared to the first level chunk group of the second document 601. In an embodiment of the invention, string content within first level chunks of the first document are compared individually to the string content within the first level chunks of the second document-determining the best match among the chunks, determining if a chunk is a leaf and determining if a chunk has no matches.

The algorithm for the matches in an example embodiment uses the "element.innerText" JavaScript attribute to obtain the text strings of each chunk for comparison.

Comparison of strings to determine a score is well known to those skilled in the art. For example the string comparison function "string-similarity" javascript library (https://www.npmjs.com/package/string-similarity) which uses the Dice's Coefficient to compute a score between 0 and 1 between two strings, 0 meaning no similarity and 1 meaning exact match and various levels of similarity between 0 and 1. One skilled in the art may leverage other libraries and algorithms to determine a string similarity score-such as using, for example, the "Levenshtein distance" and "Hamming distance". Other methods to compare content within chunks may be used to derive a score-such as using "element.innerHTML" which converts the markup within a chunk to string and comparing the markup and text together. Various alternatives may be used to improve the matching process such as ignoring whitespaces or removing certain attributes from elements before comparing.

A best match is deemed when a chunk from the first document has the highest score with a chunk of the second document compared to all the chunks in the chunk group of the second document and the chunk of the second document similarly has the highest score with the aforementioned chunk from the first document compared to all the chunks in the chunk group of the first document.

FIG. 9 900 is a table of an example comparison using the text contained within a 1st level chunk 602a on the first document with all the chunks 605a, 605b, 605c on the second document 601 with "left" referring to the first document and "right" referring to the second document. The score column shows the result of the comparisons with the best match between 602a and 605a.

FIG. 10 1000 is a table of an example match between chunks of the chunk groups of the first document 600 and second document 601, wherein left denotes the first document and right denotes the second document. This table represents an example of output from one or more executions of element 803 of FIG. 8.

As can be seen in 1000, in the example match, there are four chunks in the first level chunk group in the first document but three chunks in the first level chunk group in the second document wherein the matching algorithm matched the chunks leaving the chunk with the lowest aggregate match score 602b without a corresponding match (it has the lowest score (zero) in its own chunk group when matched with every chunks in the second document). In this example, 602b is regarded as an "orphan chunk". In an embodiment, an orphan chunk is regarded as a leaf chunk and will not be further processed to identify child chunks within it.

In an embodiment, matched chunks are also processed to determine if at least one is a leaf chunk. This is done by checking if the chunk contains terminal nodes—the definition of terminal nodes being defined earlier. If a chunk contains at least one terminal node, then the chunk is deemed a leaf chunk. If the chunk does not have any children that are chunks, the chunk is also deemed a leaf chunk.

In an embodiment, in element 804 of FIG. 8, if there are non-leaf chunks in a chunk group then the process continues to element 802 wherein the children of the non-leaf chunks are processed and repeated until all the leaf chunks are identified.

In another embodiment of the invention, the comparison of the elements in the documents may be done by cloning the content in the documents into separate and hidden iframes with the same width dimensions as the original iframes.

Taking this one step further, since 602c and its matched pair 605b are not leaf chunks, they are analyzed for child chunks. Chunks 603a and 603b are identified as child chunks of 602c and form a group chunk and 606a and 606b are identified as child chunks of 605b and form another group chunk and the chunks in one group chunk are compared to the chunks in the other group chunk are compared to each other. FIG. 10 1001 shows the results of the matching at element 803. At element 804, it is noted that although 603b and 606b contains two eligible nodes-two block elements each, in an embodiment of the invention, they are regarded as too narrow (less than 50% of the width of the content) and thus making 604a, 604b, 607a and 607b terminal nodes and thus making the parent chunks 603b and 606b "leaf chunks".

Highlighting Differing Chunks and Text

When all the leaf chunks are determined in an embodiment, the process proceeds to element 805 of FIG. 8. At element 805, leaf chunks that are matched to each other using the best match algorithm are displayed in the user interface 300 and they are rendered as shown in FIG. 7. As discussed above, the user interface of FIG. 7 shows visible indications, as discussed below, resulting from the method of FIG. 8.

In an embodiment, the first document 600 is rendered in the user interface as 700 and the second document 601 is rendered as 701. In an embodiment, leaf chunks are rendered as follows:

Leaf chunk pairs that are exact matches (score=1) to each other are rendered without highlights or outlines:

603a with 606a and 602d with 605c.

Leaf chunk pairs that are partial matches (score less than 1, more than 0) are highlighted in the user interface to show that a chunk has a matching chunk on the other document:

602a with 605a (highlighted as 702/708), 603b with 607b (highlighted as 704/710).

In this embodiment a dashed border or outline is drawn around the chunk. The terms outlines and borders are used interchangeably herein. Drawing outlines around elements are techniques well known to those in the art and can be achieved either by setting a CSS outline property on the chunk (i.e., outline-style: dashed), adding a border (border-style: dashed) or by placing an element matching the coordinates of the chunk above the chunk with a dashed border. Other methods familiar to those skilled in the art of placing an outline around a chunk can be used.

In an embodiment of the invention, matched chunks can be visibly labeled with matching identifiers such as numbers to visually show the user which chunks are matched with which chunk in the user interface. For example the chunks 602*a* and 605*a* may be labeled with the number #1, and the chunks 603*b* and 607*b* may be labeled with the number #2.

iii) Leaf chunks that are orphans without a match on the other document are highlighted in a way to show that a chunk is an orphan chunk:

703.

In an alternate embodiment of the invention, a "ghost chunk" can be inserted into the compared document 709 lacking the orphan chunk orphan chunk to show where the missing chunk would be if there was one.

In this embodiment a dotted outline is drawn around the orphan and ghost chunk.

In an alternate embodiment of the invention, orphan chunks and ghost chunks can be labeled with matching identifiers such as numbers (i.e. "orphan 1") to visually show the user which orphan chunks are matched with which ghost chunks in the user interface.

In element 806, the text content of matched leaf chunks that are partial matches are compared with each other and the text differences are further highlighted. In an embodiment of the invention textual elements present only in one chunk are wrapped with an<ins>tag. The method to compare textual elements between two pieces of HTML content and wrap differing content are well known to those skilled in the art.

In an embodiment of the invention CSS styles are added to add a background color to highlight the differing text by applying a background color to the <ins>tag. In the example of FIG. 6, the text difference in content within leaf chunk pairs 602*a*/605*a* are highlighted in FIG. 7 (706/707) and the text difference in content within leaf chunk pairs 603*b*/607*b* are highlighted as 705 and 711.

Other methods to compare text content and highlight them within two elements that are familiar to those skilled in the art may be used to highlight text may be used as well which include but not limited to applying an outline around the text, changing the color of the text or adding an opaque layer over the text.

Optional Matching Optimizations

According In an alternate embodiment of the present invention an optional element is added to further provide more granular chunks, at element 803, when comparing matching leaf chunks, if a direct child of a leaf chunk has more than one direct terminal nodes, the terminal nodes are compared in the order of the DOM tree with the terminal nodes of the matched chunk. If the terminal nodes match exactly, then those terminal nodes are regarded as discarded and element 802 is applied to the matching leaf chunks to determine if there are eligible chunks within. If eligible child chunks exist then the matching leaf chunks are no longer regarded as leaf chunks and a search for the leaf chunks within the matching chunks are continued as described in the aforementioned element 802.

Furthermore, in an embodiment of the invention, in element 801 various optimizations can be performed to the DOM or copy of the DOM to make the matching process more accurate depending on the subject matter contained within the HTML documents. For example, the matching of documents can be done either by turning HTML markup into strings (such as "<div>hello</div>" using the "innerHTML" property of an element and comparing the containers or chunks to each other. An alternative comparison method uses the plain text content within the element such as by using the "innerText" property of an element (i.e . . . <div>hello</div>becomes hello). Using the plain text content method may be preferable when a document contains a lot of HTML markup since these markup may be similar causing a lot of noise when computing a score at element 803.

However, when using plain text comparison, fidelity is lost when elements containing images and links are compared-since by default, the URL of the image (src attribute) and URL of links (href attribute) do not get converted into plain text-hence they are compared as if links or images are not present. An embodiment of the invention takes into account links and images when comparing text, the URL of any images within an element may be appended into plain text strings prior to comparing the text at element 803 and the URL of any links within an element may be appended to plain text strings prior to comparing the text at element 803.

In an alternative embodiment of the invention, when the documents comprise emails, appending URLs of links into plain text strings is not recommended and may not be done because many identical links (href attribute of links) are rewritten and converted into unique URLs to allow for the tracking of clicks when a recipient clicks on the link after opening. Since rewritten URLs will be different from each other, there is no point appending these URLs to the text prior to comparison. Following the same logic, when comparing markup (using innerHTML), the process in element 801 may remove the URL from links (or images if necessary) prior to comparing the strings between the two compared documents to increase the accuracy of matches.

In an alternative embodiment of the invention, during element 802, in addition to identifying chunks by identifying "eligible nodes", the eligible node criteria may include "special identifiers" associated with block elements. These special identifiers may include:

Identifying predetermined attributes of an element—for example "is_chunk" le.<div is_chunk>hello how are you</div>

Therefore if any element contains these attributes (i.e . . . is_chunk, is_module, content_container etc. . . . ), it is automatically considered a chunk.

Identifying predetermined elements, for example: <chunk>le.<chunk>hello how are you ?</chunk>

Therefore if any element comprises a predetermined set of elements (i.e . . . <chunk>, <module>, <content_container>), it is automatically considered a chunk.

Identifying elements within a pair of comments containing predefined attributes (i.e . . . chunk_start, chunk_end).

I.e . . . <!-(chunk_start)--><div>Hello how are you</div><!-(chunk_end)-->Therefore the top level container (div) within the comment containing the predefined attributes is automatically considered a chunk.

In an alternative embodiment of the invention, nodes associated with "special identifiers" as mentioned in point 1,2 and 3 above are regarded as "leaf chunks", wherein eligible nodes within these nodes are no longer evaluated as chunks.

Comparing the Same Document Within Different Width Containers

Often HTML documents contain CSS Media Queries that modifies the styles of elements depending on the size of the window or screen containing a document. For example, a Media Query can be set to increase the font of certain elements if the window's width shrinks to a mobile phone's width to make the text easier to read in small screens—or a Media Query can be set to display in a mobile screen a button—that is hidden in wider containers—that prompts the reader to download a mobile app-since the mobile app would only be usable on a mobile device.

In an alternate embodiment of the invention, the invention would be able to display differing widths of the same document in the left 301 and right 302 document containers in the user interface 300. The left and right containers would embed the documents within an iframe which mimics a window container that can be processed by the document's media queries. In this example, the left container 301 will be set to a "desktop" width of 800 pixels wide and the right container 302 set to a "mobile" width of 400 pixels wide.

Following this example, a document containing HTML and a button comprising a block element that is initially hidden with CSS (display:none) when the document is viewed in a wide window (i.e. 800 pixels wide) but displayed when the document is viewed in a narrow window (i.e . . . 400 pixels wide) as seen in the example below.

<div id="button">Mobile Button</div><style> #button{display:none}/*default hidden */@media only screen and (max-width:400*px*) {#button {display: block !important} } </style>

In an alternate embodiment of the invention based on the example above, when displayed in a narrow container 302 the button would be considered an eligible node, but since the button is hidden in a wide container 301, it would not be considered an eligible node and therefore the algorithm in element 803 would identify the button displayed in 302 as an "orphan chunk" even though the element exists but is only hidden in 301.

Furthermore in a further enhancement, in element 801, the process may iterate through elements in the document and identify and remove element that are visually hidden (i.e . . . . CSS "display:none", "visibility:hidden"). This would then allow the process to 806 to highlight that are present in both compared chunks (originally-prior to element 801) but only visible in one, since after 801 it the text will only be present in the visible chunk and the comparison algorithm in 806 would not detect the hidden/removed text in the compared. Alternatively, the removal of hidden elements may take place in other parts of the process, such as in element 806 itself.

Highlighting Image Elements

A further embodiment of the present invention covers the ability to detect and highlight changes in image content between sections (or complete bodies) of multiple documents containing HTML. Such image content may include HTML image elements as well as elements containing images as background images.

An embodiment compares textual parts of two sets of HTML content and wraps text that is unique to one HTML content with a<ins>tag to signify that the text does not exist in the other HTML content. In a separate embodiment (not shown) text that is unique to one HTML content is appended to the other content and wrapped with a<del>tag to signify that such content does not exist in the other HTML content.

In an embodiment of the invention CSS styles are added to add a background color to highlight the differing text by applying a background color to the <ins>tag.

Other methods to compare text content and highlight them within two elements that are familiar to those skilled in the art may be used to highlight which include but not limited to applying an outline around the text, changing the color of the text or adding an opaque layer over the text. The method to compare textual elements between two pieces of HTML content and highlight differing content are well known to those skilled in the art.

FIG. 11 is a flow chart of an embodiment of the presentation invention depicting the process of identifying and highlighting changes of image and text content between sections of two documents containing HTML.

FIG. 12 is an illustration of example embodiments of sections of two documents containing HTML with differences in textual and image content.

FIG. 13 is an illustration of example embodiments of sections of two documents containing HTML with differences in textual and image content (of FIG. 12) rendered in a user interface displaying highlights denoting changes in textual and image content.

FIG. 14 is an illustration of example embodiments of the HTML markup of sections of two documents containing HTML with differences in textual and image content.

FIG. 15 is an illustration of example embodiments of the HTML markup of sections of two documents containing HTML with differences in textual and image content (of FIG. 14) after hidden text metadata for images has been generated.

FIG. 16 is an illustration of example embodiments of the HTML markup of sections of two documents containing HTML with differences in textual and image content (of FIG. 14) after hidden text metadata for images has been generated (FIG. 15) and markup has been added to visually highlight textual changes.

At element 1100 a first section of HTML 1400 of a first HTML document as demonstrated as rendered in 1200 is selected to be compared to a second section of HTML 1401 of a second HTML document as demonstrated as rendered in 1301. It can be appreciated that the sections may be parts of a HTML document, or may represent chunks as covered in the preceding sections, or may comprise a complete HTML document. And therefore this process of 1100 may be part of element 806 or may be a completely separate flow wherein the chunking process in FIG. 8 may not be executed.

At element 1101 a first section of HTML 1400 of a first HTML document as demonstrated as rendered in 1200 is rendered into an HTML browser. The term HTML browser can encompass any application that can render HTML content including a Web browser such as Google Chrome. If the process is a continuation of element 806, then element 1101 can be skipped since the content has already been loaded into an HTML browser. In an embodiment, each section is rendered into its own iframe to segregate the CSS styles-however other methods to segregate or sandbox HTML content can be used by those familiar with the art. URL The two sections of HTML 1400 and 1401 comprise:

Two text headers each 1402 in the first section (rendered as 1202), 1406 in the second section (rendered as 1204)

Two image HTML elements each (img) 1402, 1404 in the first section (rendered as 1202, 1204), 1406, 1408 in the second section (rendered as 1206, 1208)

Two paragraphs of text each 1404, 1410 in the first section (rendered as 1204, 1210), 1408,1411 in the second section (rendered as 1208, 1211)

Wherein the image elements 1203 and 1207 have the same url (https://acme.com/mary.jpg) but 1205 and 1209 although in the same area of their respective sections have different urls (https://acme.com/lamb.jpg) and (https://acme.com/cat.jpg)

The headers and paragraphs also contain differences in text.

At element 1102, textual metadata is generated for each image elements in the sections compared.

FIG. 15 1500, 1501 shows the resulting HTML markup of the original sections 1400, 1401 after the textual metadata is generated. The purpose of the textual metadata is that it converts attributes of an image element (that is not rendered as text) to text so that the difference in the image element attributes can be compared as if they were text. The wrapper of the textual metadata is hidden so it is not visible to a user when rendered. The wrapper of the textual metadata is placed at a proximate location of the image element within the HTML document. This allows the textual metadata to be compared in relation to the surrounding text so textual metadata of corresponding images located in both sections can be compared to each other.

Attributes of image elements 1502, 1504, 1506, 1508 are added as textual content 1503, 1504, 1507, 1509, within a hidden wrapper element-such as a<span>styled with the CSS "display:none". Other methods to hide elements within HTML documents are well known to those skilled in the art may be used instead The attributes may include but are not limited to the URL of the image element (the src attribute), the alt text attribute, the title attribute, dimension information (width and height) as well any style. In an embodiment of the invention, the hidden wrapper element and its associated image element contain a same unique identifier (i.e . . . img_uuid for the image and ref_img_uuid for the wrapper element) which allows for matching later.

It can be appreciated when it comes to dimensions such as with and height one or more of the following options can be used.

Image element attribute or style: For example width="100%" or style="width:100%" or width=500 or style="width:500*px*". This may be embedded in the wrapper element as text as:

width: 100% or width: 500*px*

Computed Image Element Dimension

This refers to the actual space the image element occupies within the rendered document. For example, an image element has a width style or attribute set to"100%" and it is placed within a container 425*px* wide, the computed dimension of the image will 425*px* (if there's no margin or padding).

This value can be obtained via javascript such as:
imageElement.clientWidth.
An alternate way to obtain this value is:
window.getComputedStyle(imageElement).width.
This may be embedded as:
computed_width: 425*px*

Computed image dimensions may also be useful when dimension changes applied by embedded or linked (external) CSS as these dimensions are only applied when the content is rendered in a browser. (Embedded or linked CSS, as discussed in this paragraph, are not inline within the tags)

Take for example the following two HTML content (A and B) each with different embedded CSS styles containing CSS classes (myimg) that are associated with the image elements in the content.

Content A:
<style>.myimg {width:500*px*;}</style>
<img class="myimg" width="300" src="https://server/foo.jpg">

Content B:
<style>.myimg {width:800*px*;}</style>
<img class="myimg" width="300" src="https://server/foo.jpg">

Although there are no attribute or URL changes in the image elements, the computed width would be different because of the different respective embedded CSS styles of A and B. le.

Content A: computed_width: 500*px*
Content B: computed_width: 800*px*

Native Image Dimension:

This refers to the dimension of the image element if the image element was simply placed on an empty page without containers or dimension attributes. Native image dimension is a reference to the dimension of the source image itself. A method to obtain a native image dimension is by creating an image container element and absolutely positioning it outside of the rendered document and placing a copy of the image within the container element and then reading the dimension of the image element such as in javascript:

imageElement.width or imageElement.naturalWidth.

For example for a 500*px* image, this value may be embedded as text as:

natural_width: 500*px*

In an embodiment of the invention, image elements smaller than a certain dimension (such as an image element that is a single pixel wide and height) can be excluded from being compared. This is because in certain cases such as when the HTML content is part of an email, tiny images may be embedded to track if an email is opened. In this case it would not be advantageous to highlight these images. It may be advantageous to also not highlight smaller images which may be part used as "spacers" (transparent images used to pad spaces to adjust the layout of a document). In these cases, image elements under a certain dimension such as 20 pixels wide may be excluded.

At Element 1103, the text of the textual content of both sections are compared and text that is unique to one section is wrapped with a<ins>tag to signify that the text does not exist in the other section. In a separate embodiment (not shown) text that is unique to one HTML content is appended to the other content and wrapped with a<del>tag to signify that such content does not exist in the other HTML content.

In an embodiment of the invention CSS styles are added to add a background color to highlight the differing text by applying a background color to the <ins>tag.

Other methods to compare text content and highlight them within two elements that are familiar to those skilled in the art may be used to highlight which include but not limited to applying an outline around the text, changing the color of the text or adding an opaque layer over the text. The method to compare textual elements between two pieces of HTML content and highlight differing content are well known to those skilled in the art FIG. 16 1600, 1601 shows the resulting HTML markup of the sections 1500, 1501 after the HTML content has been modified the markup to highlight the differences (additions) in the sections.

In an embodiment of the invention, textual content changes 1602, 1603, 1605, 1606, 1607, 1609, 1611 are wrapped with the <ins>element and CSS (Cascading Style Sheet) styles are added to <ins>elements to visually highlight the changes in their respective changes when rendered by a HTML capable client.

An example of a highlight CSS is the following which will set the background of changed text to the color orange:
<style>ins {background-color: orange;}</style>

In an embodiment, although the image element metadata changes are also wrapped with <ins> or <del>tags 1605, 1609, they are not visible so the image elements with changed attributes (i.e. URL) 1604, 1608 would still not be highlighted at this point. Specifically text that are unique to a section is deemed "inserted" and hence wrapped with the <ins>tag. Additionally, text that are unique to the other section but not in the current section is added to the current section and wrapped with a<del>tag. Since the textual metadata is located proximate to the surrounding textual content, textual metadata that is completely wrapped with a<del>tag would denote an image element that is unique to that section and not present in the other section.

At Element 1104, the text within the image textual metadata wrappers 1605, 1609 are processed to locate<ins>tags within it. The following Javascript code can be used to retrieve a list of <ins>elements within identify textual metadata wrappers (said wrappers contain the attribute "ref_img_uuid"):

document.querySelectorAll("[ref_img_uuid] ins");
The similar procedure can be used to locate<del>tags as well.

The parent nodes (the wrapper itself) 1605, 1609 of the list of located<ins>(or <del>) elements within the textual metadata wrappers can be retrieved by calling "element-.parentNode". Once the parent nodes are retrieved, the associated changed image can be located by locating the images having image_uuid attributes 1604, 1608 that matches with the ref_img_uuid value of the wrappers 1605, 1609.

The process then highlights the image elements 1604, 1608 that contain changes in the textual by applying an outline to these image elements. An example method to apply an outline in CSS is as follows:

imageElement.style.setProperty("outline", "5px dashed orange", "important");

Other methods to apply an outline or visually highlight an image element that is changed may be used that are known to those skilled in the art such as applying borders, changing the opacity, adding a color filter over an image to change the image element's tint and applying an indicator or icon next to the image element.

At Element 1105, the process is completed. As shown in FIG. 13, at 1104, the rendered sections 1300 and 1301 have text highlights displayed 1302, 1304, 1310, 1306, 1308, 1311 as well as highlights (dashed outline) on image elements with changed attributes 1305, 1309.

Highlighting Background Image Changes

It would be advantageous in addition to detect changes in elements between two content sections that contain different background images. Background images are not HTML image elements (<img>) but attributes applied to non HTML image elements (such as <div>, <span>, <table>, <td>) to display imagery in the background of the element.

In another preferred embodiment of the invention at Element 1102, each element within both content sections are traversed to locate if an element contains background images. A method to obtain background image values of elements can be done using the following javascript:

window.getComputedStyle(element).backgroundImage

If the value is 'none', the element has no background image. Otherwise, the background image value will be returned. Using getComputedStyle is beneficial as it also allows the routine to detect background image changes in CSS set in linked (external) or embedded CSS like the following.

<style>.mydiv {background-image:url(https://server/foo.jpg) !important;}</style><div class="mydiv" style="background-image:url(https://server/aaa.jpg)">My Content</div>

Using getComputedStyle would yield the value: https://server/foo.jpg. Whereas element.style.backgroundImage would yield the value: https://server/aaa.jpg.

In an embodiment of the invention the element of 1102 hidden textual metadata would be generated and both values would be stored in the hidden textual metadata as:

Background_image: https://server/aaa.jpg
Computed_background_image: https://server/foo.jpg A further enhancement to an embodiment of the invention is to add other background attributes such as background-size and background-position as part of the textual metadata so they can be compared textually. This can be done by accessing the "background" value from the computed style instead of the "backgroundImage" value.

The hidden textual metadata is linked to the element using a similar scheme Element attribute: elem_uuid=<generated unique identifier>Hidden textual metadata wrapper: ref_elem_uuid=<same generated unique identifier>

So, at element 1104, the similar routines would be able to detect elements within hidden textual metadata that has changed, locate the corresponding element with the changed background image and apply the highlight or outline to the element.

Highlighting Changes in Other Non-Textual Elements

The method to highlight images can also be used to highlight changes and differences of two content sections of non-textual elements by converting attributes of those elements to hidden textual elements such as title and href attributes in links, as well as attributes of elements such as font, text color, text size, background colors and dimensions (with, height).

Using the disclosed embodiments of the present invention it would be possible to detect and highlight changes only when selected attributes of elements are changed but not others, allowing for a more precise highlighting of content.

Other Non-HTML Documents

It can be appreciated that the invention and its embodiments can be applied to any document containing markup such as XML and not just strictly HTML.

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each element may contain one or more sub-elements. For the purpose of illustration, these elements (as well as any and all other elements identified and described above) are presented in order. It will be understood that an embodiment can contain an alternate order of the elements adapted to a particular application of a technique disclosed herein. All such variations and modifications are intended to fall within the scope of this disclosure. The depiction and description of elements in any particular order is not intended to exclude embodiments having the elements in a different order, unless required by a particular application, explicitly stated, or otherwise clear from the context.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure the focus of the invention. The invention is capable of myriad modifications in various obvious aspects, all without departing from the spirit and scope of the embodiments of the present invention. Accordingly, the drawings and descriptions are to be regarded as illustrative in nature and not restrictive.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claims. It is intended that broader claims will be submitted in an application that claims the benefit of priority from this application.

What is claimed is:

1. A method to compare two hypertext markup language (HTML) documents, comprising:

receiving at a user interface a user request to render a first document and a second document within an HTML compatible browser, the first and second documents comprising HTML having non-identical HTML content, said first document containing a first element and said second document containing a second element, the second element located at a respective same location in the second document as the first element in the first document;

said first and second elements differing in one or more computed CSS Styles, where the computed CSS style refers to a final value of CSS styles determined after all CSS rules have been applied, including at least inline CSS styles and embedded CSS styles;

comparing the HTML content between the two documents, said comparing comprising retrieving one or more differing computed CSS styles within said first and second documents, and comparing the retrieved one or more differing computed CSS styles; and based on the comparing, when there is a difference between one or more differing computed CSS styles, highlighting the first and second elements.

2. The method of claim 1 wherein the highlighting of the first and second elements comprises adding an outline around the first and second elements.

3. The method of claim 1 wherein the highlighting of the first and second elements comprises one or more of:

a. changing the opacity of the first and second elements;

b. adding a filter to change the tint of the first and second elements; or c. adding a visual indicator.

4. The method of claim 2 wherein said computed CSS styles further comprise a width and a height of an HTML image element.

5. The method of claim 4 wherein the computed width and height is based on a rendered width and height of an image element within the browser.

6. The method of claim 5 wherein said image elements are associated with one or more CSS styles, wherein said computed width and height values are specified within the one or more CSS styles, wherein the CSS styles do not include inline CSS.

7. The method of claim 1 where said computed CSS styles comprise a background-image URL and said first and second element comprising HTML elements that are not HTML images, where the first element contains a different URL in the background-image attribute as the second element.

8. The method of claim 7 wherein said image characteristics further comprise the background-image URL, wherein the background-image URL is set in one or more embedded or linked CSS styles.

\* \* \* \* \*